(12) United States Patent
Sakakibara

(10) Patent No.: US 6,943,792 B2
(45) Date of Patent: Sep. 13, 2005

(54) THREE-DIMENSIONAL DATA GENERATING DEVICE

(75) Inventor: Kuniteru Sakakibara, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 187 days.

(21) Appl. No.: 10/002,148

(22) Filed: Dec. 5, 2001

(65) Prior Publication Data

US 2002/0080135 A1 Jun. 27, 2002

(30) Foreign Application Priority Data

Dec. 25, 2000 (JP) ................................ 2000-0392952

(51) Int. Cl.⁷ ................................................ G06T 17/00
(52) U.S. Cl. .................. 345/428; 345/634; 345/640; 382/293
(58) Field of Search ................................ 345/419, 428, 345/634, 640; 382/293

(56) References Cited

U.S. PATENT DOCUMENTS

| | | | | |
|---|---|---|---|---|
| 5,422,989 A | * | 6/1995 | Bell et al. ............. | 345/689 |
| 5,550,937 A | * | 8/1996 | Bell et al. ............. | 382/293 |
| 6,532,011 B1 | * | 3/2003 | Francini et al. ....... | 345/420 |

FOREIGN PATENT DOCUMENTS

| | | |
|---|---|---|
| JP | 08-087585 | 4/1996 |
| JP | 2000-076452 | 3/2000 |

OTHER PUBLICATIONS

Akimoto et al., "Automatic Creation of 3D Facial Models", Computer Graphics and Applications, IEEE, vol.: 13 Issue: 5, Sep. 1993 pp.: 16–22.*

* cited by examiner

Primary Examiner—Kimbinh T. Nguyen
(74) Attorney, Agent, or Firm—Burns, Doane, Swecker & Mathis, LLP (57) ABSTRACT

A method of generating three-dimensional data includes the steps of inputting multiple images having a first resolution from different viewpoints of an object; storing the input multiple images; performing a resolution conversion of each of the input multiple images to generate converted images having a second resolution that is different than the first resolution; storing the converted images; detecting characteristic areas of the object from at least one of the input multiple images; and constructing three-dimensional data by using data from the input images for the characteristic areas of the object and by using data from the converted images for remaining areas of the object. A device for performing the method is also disclosed.

16 Claims, 6 Drawing Sheets

THREE-DIMENSIONAL DATA GENERATING DEVICE

CROSS-REFERENCE TO RELATED APPLICATIONS

The present application claims the priority of Japanese Patent Application No. 00-0392952, filed in Japan on Dec. 25, 2000, the entire contents of which are hereby incorporated by reference.

BACKGROUND OF THE INVENTION

1. Field of the Invention

The present invention relates to a device that generates highly accurate three-dimensional data at a high speed.

2. Description of the Related Art

In recent years, three-dimensional CG (three-dimensional Computer Graphics) technology has often been used in movies and games. Because three-dimensional CG places and moves three-dimensional models and lighting in a virtual three-dimensional space, a high level of freedom of expression may be obtained.

Non-contact three-dimensional measuring devices using the light-section method and similar methods have conventionally been used commercially. If measurement is performed using such a device, three-dimensional data of the object may be generated.

Furthermore, a stereo imaging device is known that obtains multiple images of an object using two cameras, and that generates three-dimensional data from these images. It comprises multiple cameras in which external parameters (the positions and orientations of the cameras) and internal parameters (the focal lengths, pixel pitch) are calibrated. Mutually corresponding points are sought (this operation is termed 'searching' or 'detection') regarding the multiple images obtained, and distances are measured based on the principle of triangulation. As a search method for the corresponding points, the correlation method or slope method may be used.

The three-dimensional data generated in the manner described above has a uniform resolution throughout. Therefore, if there is an excessively large amount of data, processing takes a long time, while if there is an excessively small amount of data, poor precision results.

For example, in the case of a stereo imaging device, the distance precision, i.e., the precision regarding the configuration of the object, depends on the accuracy in the search for corresponding points. The precision regarding corresponding points increases as the image resolution increases. However, as the precision or resolution regarding corresponding points increases, the time required for processing also increases. Accordingly, the amount of resulting three-dimensional data also increases.

Normally, an object to be modeled has areas that have complex shape characteristics and areas that do not. For example, in the case of a person's head, the eyes, nose, mouth and ears have complex shape characteristics, but the cheeks and forehead have relatively simple shape characteristics.

Conventionally, where an object to be modeled has both areas with complex shape characteristics and areas with simple shape characteristics, as described above, imaging or measurement is performed using the precision required to perform modeling of a complex configuration, and the amount of the resulting three-dimensional data is reduced by reducing the data in accordance with the three-dimensional characteristics of each area.

However, in the conventional art, because high-precision three-dimensional data is generated first and the data reduction process takes place afterward, the problem arises that the entire processing sequence is time-consuming.

OBJECTS AND SUMMARY

The present invention was created in view of the problem identified above, and an object thereof is to provide a three-dimensional data generating device that can maintain the high resolution of areas having complex shape characteristics and still reduce the processing time.

According to one aspect of the present invention, an apparatus for generating a three-dimensional data set comprises an acquiring portion for acquiring a first original data set and a second original data set, the first original data set and the second original data set respectively representing first and second original images, each of the first and second original images being obtained by imaging a same object from differing observation points; a resolution multiplication unit for converting the first original data set and the second original data set to a first low resolution data set and a second low resolution data set, respectively; and a three-dimensional generating portion for generating a three-dimensional data set using the first original data set and the second original data set and the first low resolution data set and the second low resolution data set; wherein the three-dimensional data set comprises a first part and a second part, the first part is generated using the first original data set and the second original data set, and the second part is generated using the first low resolution data set and the second low resolution data set.

According to another aspect of the present invention, a three-dimensional data generating device comprises means for inputting multiple images having a first resolution from different viewpoints of an object; a converter for performing a resolution conversion of each of the input multiple images to generate converted images having a second resolution that is different than the first resolution; a characteristic area extraction unit for detecting characteristic areas of the object from at least one of the input multiple images; and a three-dimensional construction unit for constructing three-dimensional data by using data from the input images for the characteristic areas of the object and by using data from the converted images for remaining areas of the object.

According to another aspect of the present invention, a three-dimensional data generating device comprises means for inputting multiple images that include multiple images obtained from different viewpoints of an object and having different resolutions; a characteristic area extraction unit for selecting specific areas from at least one image; and a three-dimensional construction unit for reconstructing three-dimensional data by using, from among said multiple images having different resolutions, high-resolution images for the selected areas, and low-resolution images for the non-selected areas, and by seeking correspondence between the images obtained from different viewpoints.

According to yet another aspect of the present invention, a three-dimensional data generating device comprises means for inputting multiple images obtained from different viewpoints; means for performing resolution conversion regarding each of the input multiple images and generating multiple images having different resolutions; means for seeking correspondence between the images obtained from different viewpoints using low-resolution images and reconstructing low-resolution three-dimensional data; means for fitting a standard model to the reconstructed low-resolution three-dimensional data; means for projecting the specific areas specified in said standard model to an image having a higher resolution than said image based on the result of the fitting; means for seeking correspondence between the images obtained from different viewpoints using the high-resolution image regarding the areas projected on the higher-resolution image and reconstructing high-resolution three-dimensional data; and means for replacing the low-resolution three-dimensional data regarding said specific areas with high-resolution three-dimensional data.

According to still yet another aspect of the present invention, a method for generating a three-dimensional data set comprises acquiring a first original data set and a second original data set, the first original data set and the second original data set respectively representing first and second original images, each of the first and second original images being obtained by imaging a same object from differing observation points; converting the first original data set and the second original data set to a first low resolution data set and a second low resolution data set, respectively; and generating a three-dimensional data set using the first original data set and the second original data set and the first low resolution data set and the second low resolution data set; wherein the three-dimensional data set comprises a first part and a second part, the first part is generated using the first original data set and the second original data set, and the second part is generated using the first low resolution data set and the second low resolution data set.

According to another aspect of the present invention, a method of generating three-dimensional data comprises the steps of inputting multiple images having a first resolution from different viewpoints of an object; performing a resolution conversion of each of the input multiple images to generate converted images having a second resolution that is different than the first resolution; detecting characteristic areas of the object from at least one of the input multiple images; and constructing three-dimensional data by using data from the input images for the characteristic areas of the object and by using data from the converted images for remaining areas of the object.

DETAILED DESCRIPTION OF THE PREFERRED EMBODIMENTS

Figure 1:
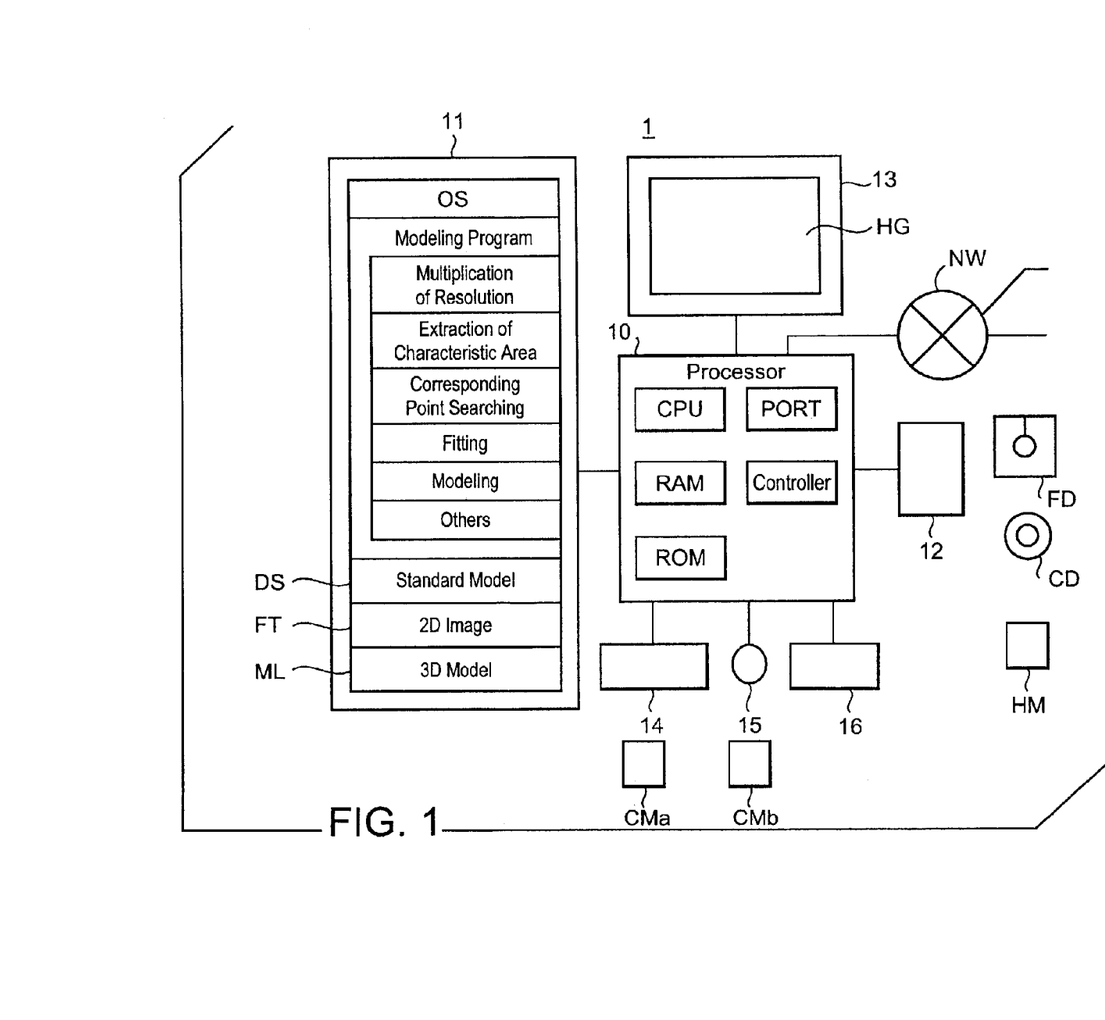
FIG. 1 is a block diagram showing a modeling device pertaining to the present invention.

FIG. 1 is a block diagram showing a modeling device 1 pertaining to the present invention.

In this embodiment, images of the head of a person are captured using two cameras from different viewpoints, and a three-dimensional model (three-dimensional data) ML of the head is generated based on the two images obtained.

As shown in FIG. 1, the modeling device 1 comprises a processor 10, a magnetic disk device 11, a medium drive 12, a display 13, a keyboard 14, a mouse 15, a scanner 16 and cameras CMa and CMb.

The processor 10 comprises a CPU, a RAM, a ROM, a video RAM, an I/O port and various controllers. When the CPU executes the programs stored in the RAM and the ROM, the various features explained below are implemented on the processor 10.

In the magnetic disk device 11 are stored the OS (Operating System), a modeling program PR for generating the three-dimensional model ML, other programs, a standard model (standard model data) DS, two-dimensional images (two-dimensional image data) FT, the resulting three-dimensional model ML and other data. These programs and data are loaded in the RAM of the processor 10 from time to time, as needed.

The modeling program PR includes processes for multiplication of resolution, extraction of characteristic areas, corresponding point searching, positioning, transformation, modeling and other types of processing.

The medium drive 12 accesses a CD-ROM (CD), a floppy disk FD, a photomagnetic disk, a semiconductor memory HM, such as a compact flash, or other recording medium to perform read and write of data or programs. An appropriate drive is used depending on the type of recording medium. The modeling program PR mentioned above may be installed from this recording medium. The standard model DS and two-dimensional images FT may also be input via the recording medium.

The various data mentioned above, the three-dimensional model ML, which is generated by the modeling program PR, and other data or images are displayed on the screen HG of the display 13.

The keyboard 14 and mouse 15 are used to input data or provide instructions to the processor 10.

The scanner 16 scans letters or images, and converts them into image data. In this embodiment, the images captured by the cameras CMa and CMb are converted into two-dimensional images FT.

The cameras CMa and CMb are located such that there is a prescribed distance between the principal points of the lenses. The cameras CMa and CMb capture two images of the object from different viewpoints.

Two cameras may be located at appropriate locations as cameras CMa and CMb, or a camera incorporating two cameras may be used. Alternatively, one camera may be moved to perform multiple sessions of imaging.

Where digital cameras are used as cameras CMa and CMb, two-dimensional images FT may be directly obtained. The two-dimensional images FT obtained may be incorporated into the magnetic disk device 11 via the semiconductor memory HM, or via an interface such as an RS-232C or USB.

The modeling device 1 may comprise a personal computer, a workstation or the like. The programs and data mentioned above may be obtained by receiving them via the network NW.

The sequence of the processing performed by the modeling device 1 will be explained with reference to block diagrams, which show the functions of the modeling device 1, and a flow chart.

Figure 2:
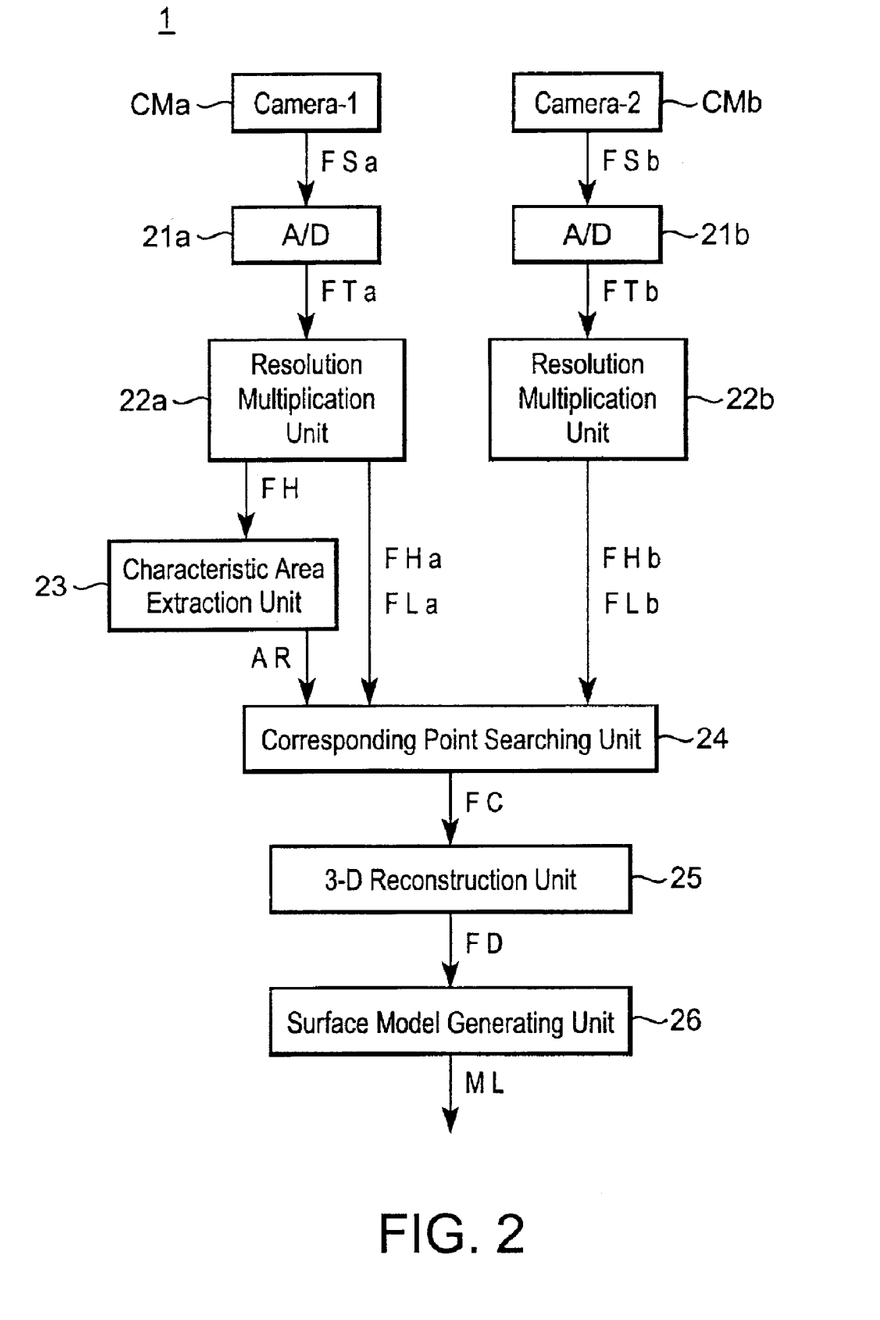
FIG. 2 is a block diagram showing the functions of the modeling device of FIG. 1.
Figure 3:
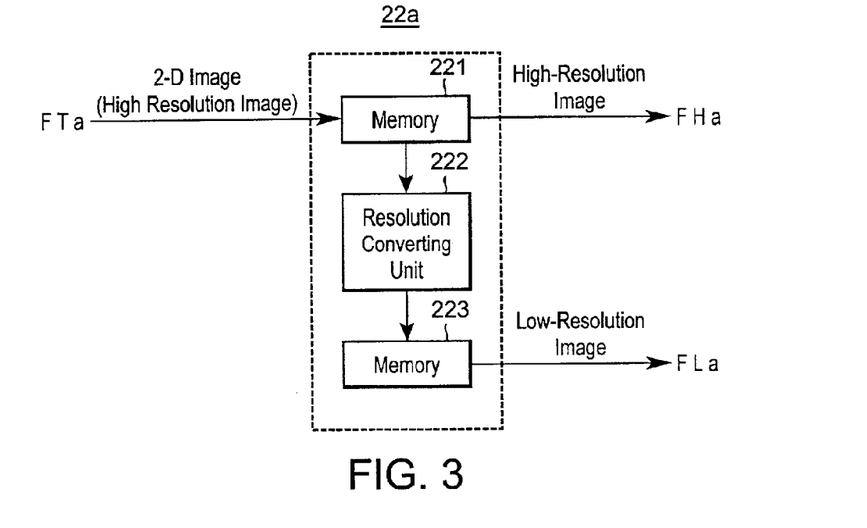
FIG. 3 is a block diagram showing the construction of a resolution multiplication unit.
Figure 4:
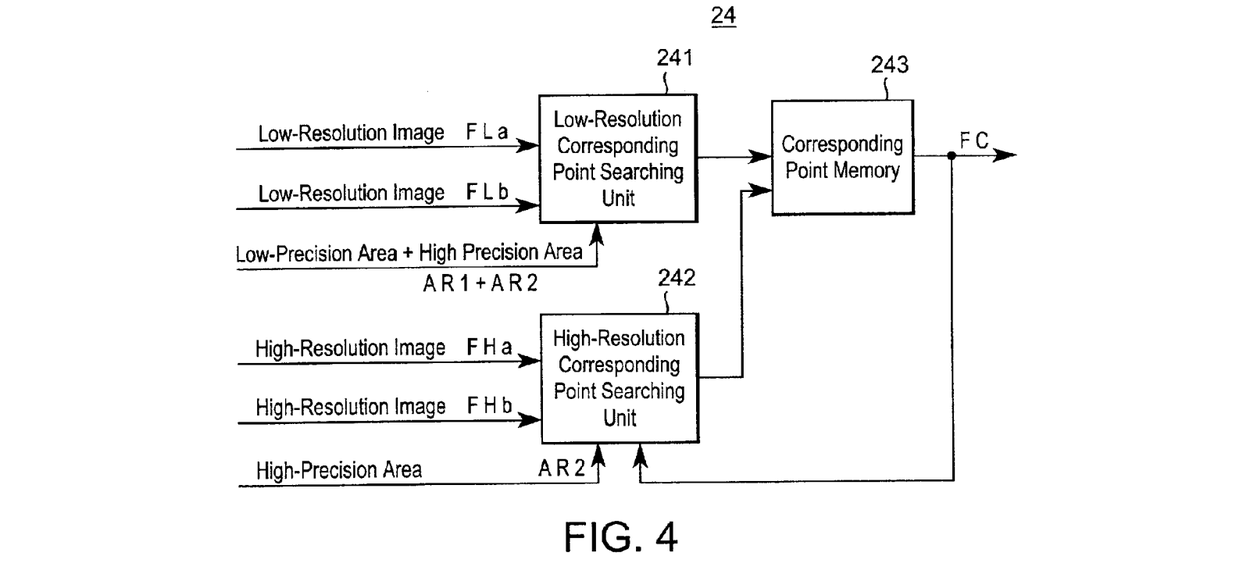
FIG. 4 is a block diagram showing the construction of a corresponding searching unit.

FIG. 2 is a block diagram showing the functions of the modeling device 1, FIG. 3 is a block diagram showing the construction of the resolution multiplication unit 22a, FIG. 4 is a block diagram showing the construction of the corresponding point searching unit 24, and FIG. 5 is a drawing showing the process of extraction of characteristic areas of a person's head.

The image FSa captured using the camera CMa is deemed the standard image. The AD converters 21a and 21b and the resolution multiplication units 22a and 22b each have the same construction. Therefore, only one of each type of unit will be explained. In addition, they may be referred to as an AD converter 21 or as a resolution multiplication unit 22, indicating one unit or both units.

Referring to FIG. 2, the images FSa and FSb captured by the cameras CMa and CMb are quantized by the AD converters 21a and 21b, respectively, whereupon two-dimensional images FTa and FTb are generated. These two-dimensional images FTa and FTb are high-resolution images.

Low-resolution images are generated from the two-dimensional images FTa and FTb by the resolution multiplication units 22a and 22b.

As shown in FIG. 3, the input two-dimensional image FTa is stored in the memory 221. It is then converted into a low-resolution image by the resolution converting unit 222 and stored in the memory 223. Storage and conversion are performed regarding the two-dimensional images FTa and FTb that are input. Consequently, a high-resolution image and a low-resolution image result from each of the two-dimensional images FTa and FTb.

The resolution converting unit 222 reduces the two-dimensional image FTa stored in the memory 221, for example, so that the resolution is reduced to half of the original image in both the horizontal and vertical directions. Consequently, the resolution is converted into half of the original resolution. If the original image is reduced by one-third in both directions, the resolution is converted into one-third of the original resolution. Various appropriate resolutions may be achieved through this conversion.

Therefore, multiple high-resolution images FHa are stored in the memory 221, while multiple low-resolution images FLa are stored in the memory 223. When a needed image is designated, a high-resolution image FHa and a low-resolution image FLa that correspond to the designated image are read from the prescribed areas of the memories 221 and 223, respectively. The thus read images are output to the characteristic area extraction unit 23 and the corresponding point searching unit 24.

The characteristic area extraction unit 23 separates, using a two-dimensional image processing technology, areas that require high-precision three-dimensional modeling and areas that do not from the high-resolution image FHa, which was obtained via the camera CMa and comprises the standard.

Figure 5A:
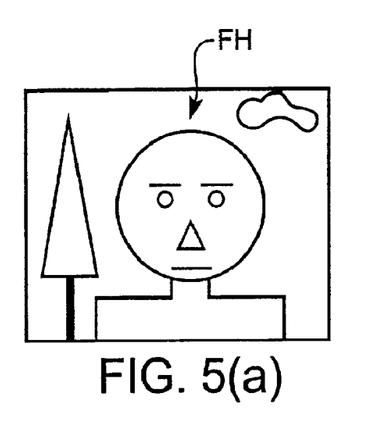
FIG. 5 is a drawing showing the method of extraction of characteristic areas of a person's head.
Figure 5B:
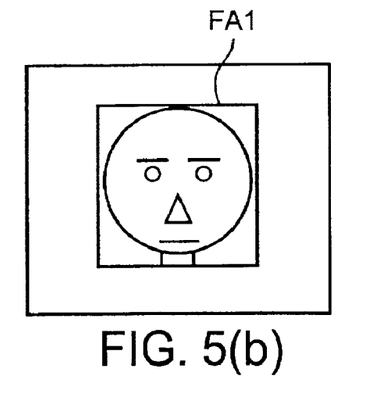
Figure 5C:
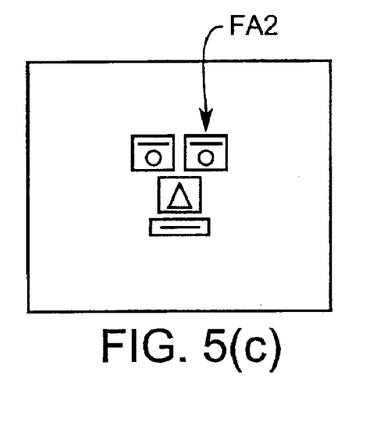

In other words, from the high-resolution image FHa shown in FIG. 5(A), only the person's head (i.e., the face area) is extracted to obtain the head image FA1 shown in FIG. 5(B). The eye, nose and mouth areas, which are areas requiring high precision, are extracted from the head image FA1 to obtain the high-precision area images FA2 shown in FIG. 5(C).

The technology to extract the face area and the face components, such as the eyes, nose and mouth, from a two-dimensional image as described above is in the public-domain. Extraction of these areas may be attained automatically using this technology or manually by the operator.

Figure 5D:
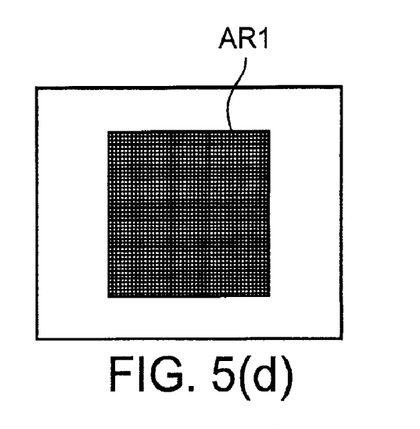

The area AR1 shown in FIG. 5(D) includes both high-precision areas and low-precision areas. The area AR1 comprises the same area as the head image FA1 shown in FIG. 5(B).

Figure 5E:
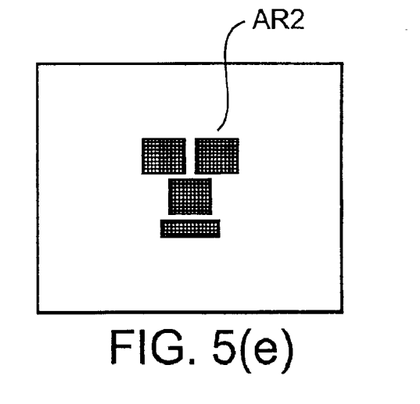
Figure 5F:
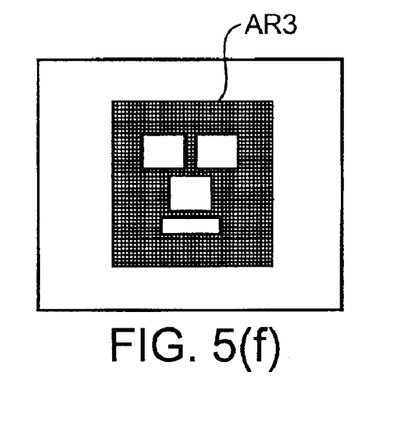

The areas AR2 shown in FIG. 5(E) are high-precision areas. The areas AR2 comprise the same areas as the high-precision area images FA2 shown in FIG. 5(C). The area AR3 shown in FIG. 5(F) is a low-precision area. It is what remains by subtracting the areas AR2 shown in FIG. 5(E) from the area AR1 shown in FIG. 5(D).

For the high-precision areas, those parts that play an important role in the facial expression are selected. High-precision areas are also referred to as 'characteristic areas' and 'specific areas' in the present invention.

Returning to FIG. 2, the corresponding point searching unit 24 searches for points corresponding to the extracted areas. For the area AR3, which is a low-precision area, corresponding points are sought using the low-resolution images FL, and for the areas AR2, which are high-precision areas, corresponding points are sought using the high-resolution images FH. The corresponding point data FC, which is the result of the corresponding point searching, is then output to the three-dimensional reconstruction unit 25. This process will be explained in detail below.

The three-dimensional reconstruction unit 25 seeks from the corresponding point data FC, using public-domain technology based on the principle of triangulation, three-dimensional position data FD for point groups comprising each corresponding point.

The surface model generating unit 26 converts the three-dimensional position data FD into a surface model (three-dimensional model ML) appropriate for three-dimensional display. This is publicly known as modeling technology. A three-dimensional model ML is output from the surface model generating unit 26.

Referring to FIG. 4, the corresponding point searching unit 24 includes a low-resolution corresponding point searching unit 241, a high-resolution corresponding point searching unit 242 and a corresponding point memory 243.

The low-resolution corresponding point searching unit 241 seeks correspondence between the low-resolution images FLa and FLb, which were obtained from different viewpoints, with regard to the low-precision area (AR3) and the high-precision areas (AR2).

For the method of corresponding point search, various public-domain technologies, such as the block correlation method or the gradient equation solution method, are used. Correspondence of image coordinates in the low-resolution image FLb, which is the input image for the corresponding point search, to each pixel of the low-resolution image FLa, which is the standard input image, is sought. When this is done, the image coordinate in the low-resolution image FLb regarding which correspondence to the low-resolution image FLa is sought may be a pixel or a sub-pixel, which is smaller than a pixel, depending on the method used. In either case, the precision is proportional to the pixel precision, i.e., the resolution, of the input image.

When corresponding point searching performed by the low-resolution corresponding point searching unit 241 is completed, the result of the search is stored in the corresponding point memory 243.

Correspondence between the high-resolution images FHa and FHb is then sought regarding the high-precision areas (AR2) by the high-resolution corresponding point searching unit 242. When this is done, the result of the corresponding point search that was performed by the low-resolution corresponding point searching unit 241 and was stored in the corresponding point memory 243 is used as the default value. Consequently, the corresponding point search performed by the high-resolution corresponding point searching unit 242 may be carried out more accurately and rapidly.

When the corresponding point search performed by the high-resolution corresponding point searching unit 242 is completed, the result regarding the above areas is stored in the corresponding point memory 243 in such a manner that it replaces the result of the corresponding point search performed by the low-resolution corresponding point searching unit 241.

As described above, for low-precision areas, corresponding point searching is performed based on low-resolution images FL, and low-resolution, low-precision corresponding points are obtained. For high-precision areas, corresponding point searching is performed based on high-resolution images FH, and high-resolution, high-precision corresponding points are obtained.

The corresponding point memory 243 stores the corresponding point data FC, which is the result of combining the low-precision corresponding points and the high-precision corresponding points.

It is also acceptable if the low-precision corresponding points and the high-precision corresponding points are not combined, but are separately stored in the corresponding point memory 243.

Three-dimensional positions are reconstructed by the three-dimensional reconstruction unit 25 from the corresponding points obtained in this way, as described above, and three-dimensional position data FD is sought. Consequently, the processing speed may be increased and the data amount may be reduced while the precision of important areas is maintained at a high level.

In addition, because the result of the low-resolution corresponding point search is used as the default value for the high-resolution corresponding point search, the processing speed and precision may be further increased.

While the corresponding point searching unit 24 shown in FIG. 4 includes a low-resolution corresponding point searching unit 241 and a high-resolution corresponding point searching unit 242, which are separate from each other, the construction may instead employ a common corresponding point searching unit that alternates between use for low-resolution corresponding point searching and use for high-resolution corresponding point searching.

Furthermore, the resolution multiplication unit 22 was explained as creating images having two different resolutions in order to simplify the explanation, but it may also generate images having three or more different resolutions.

A modeling device 1B of another embodiment will now be explained.

Figure 6:
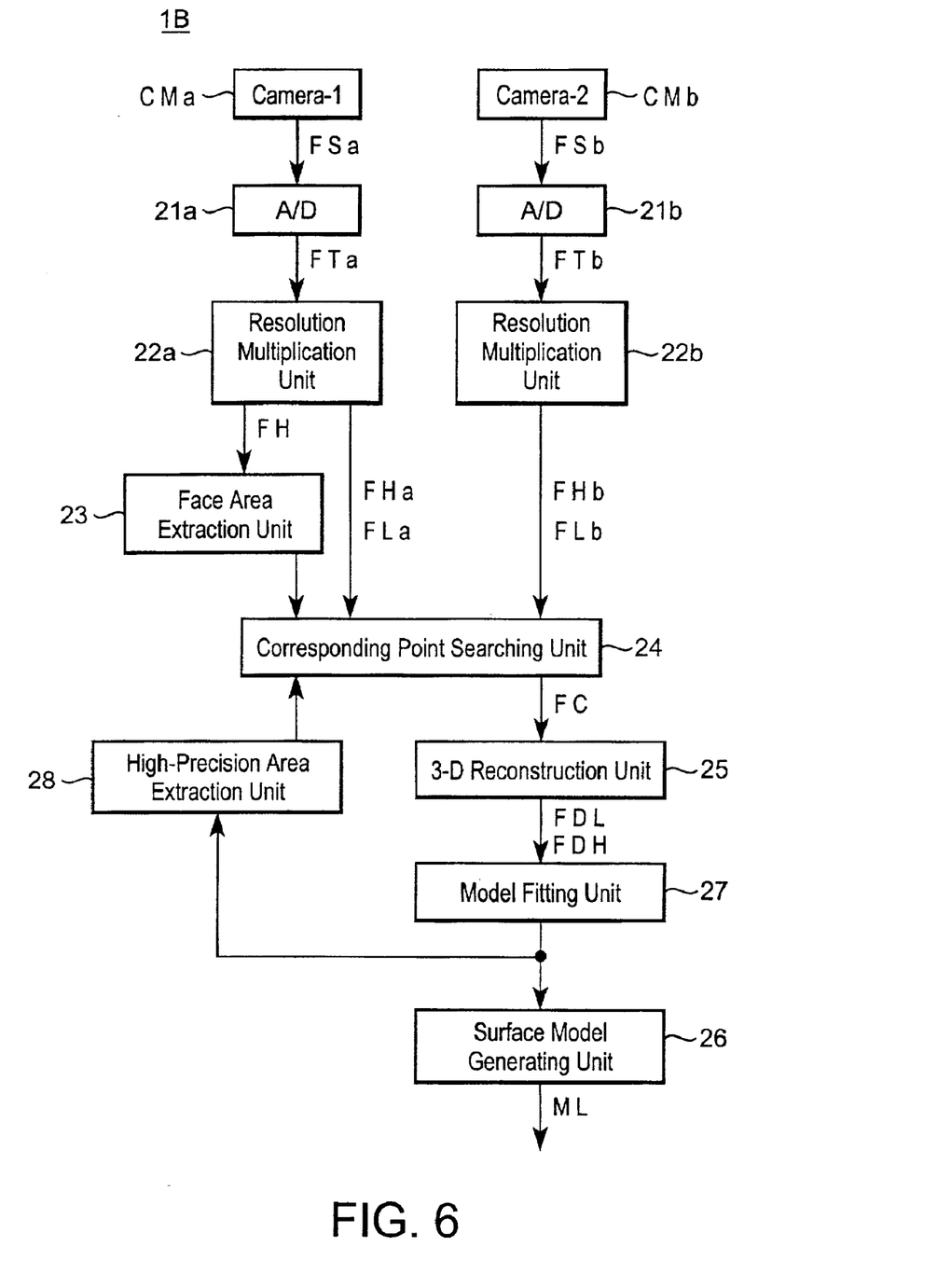
FIG. 6 is a block diagram showing the functions of a modeling device of another embodiment of the present invention.

FIG. 6 is a block diagram showing the functions of the modeling device 1B.

The modeling device 1B shown in FIG. 6 uses the same hardware construction as the modeling device 1 shown in FIG. 1, and has many common functions. Therefore, identical numbers are used for members having the same function as in the modeling device 1 shown in FIG. 1, and explanations regarding such members will accordingly be omitted or simplified.

In the modeling device 1B, a standard model DS, which is prepared in advance, is fit to the three-dimensional position data FD obtained by the three-dimensional reconstruction unit 25 regarding the person's head. The first three-dimensional data to be generated is low-resolution three-dimensional position data FDL, and fitting is performed by the model fitting unit 27 to this low-resolution three-dimensional position data FDL.

Subsequently, using the transformation parameters obtained through the low-resolution fitting, high-precision areas are extracted by the high-precision area extracting unit 28. Therefore, the positions of the high-precision areas, such as the eyes, nose and mouth, are specified in advance in the standard model DS.

Corresponding point searching is performed by the corresponding point searching unit 24 regarding the extracted high-precision areas. Using the result of the corresponding point search for the high-precision areas, the three-dimensional reconstruction unit 25 generates high-resolution three-dimensional position data FDH. It is also acceptable if the resulting high-resolution three-dimensional position data FDH replaces appropriate parts of the previously-obtained low-resolution three-dimensional position data FDL. The standard model DS, which was used for low-resolution fitting, is then fit to the high-resolution three-dimensional position data FDH by the model fitting unit 27.

During the fitting by the model fitting unit 27, the standard model DS is positioned to match the three-dimensional data DT (initial fitting), and is subsequently transformed. For the fitting method, any public-domain method or other method may be used.

As described above, the model fitting method is used in which the standard model DS is transformed and fit to the three-dimensional position data FD, and a three-dimensional model ML is expressed using the transformation parameters therefrom. Consequently, partial loss of the three-dimensional position data FD that may be caused by the effect of the light source during imaging of the object, or by occlusion, may be compensated for.

In addition, because only transformation parameters are required as output data, compression of the modeling data may be simultaneously achieved.

Figure 7:
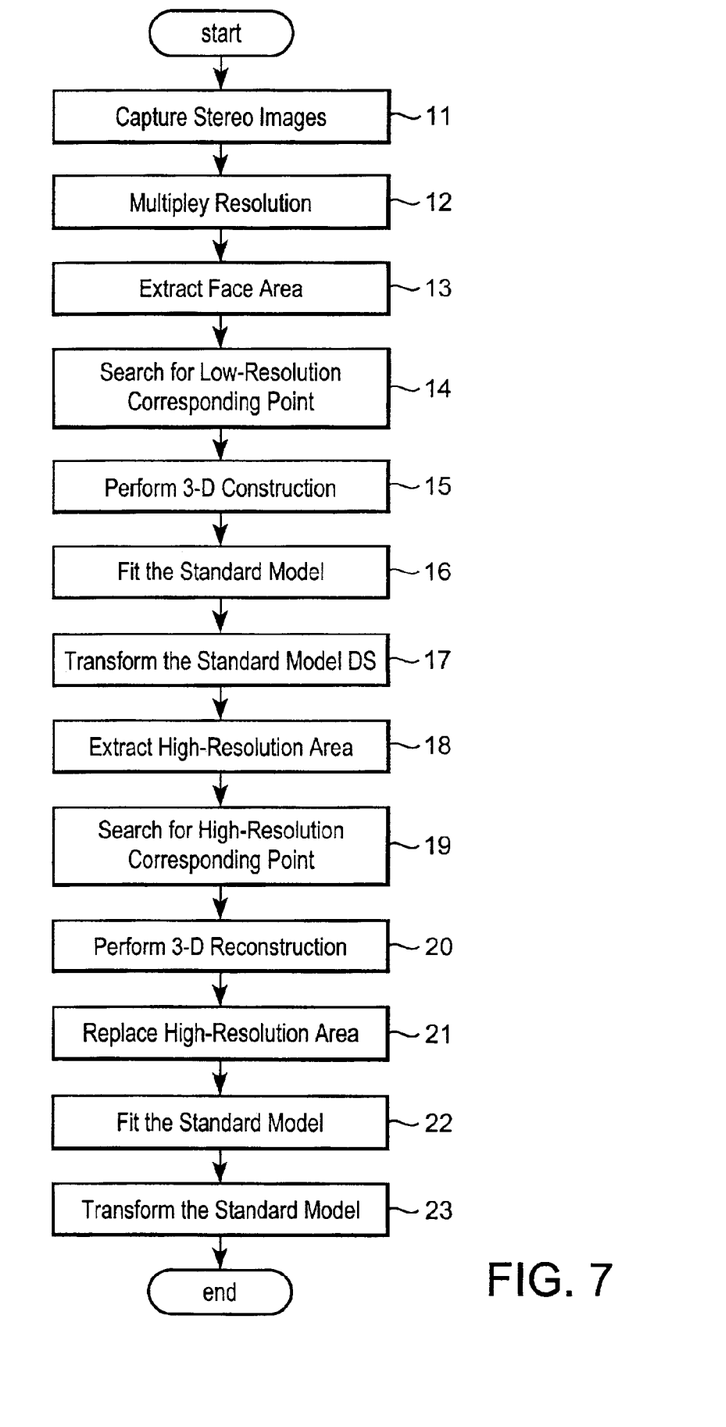
FIG. 7 is a flow chart showing the sequence of operation for the modeling device of another embodiment.

FIG. 7 is a flow chart showing the sequence of the operation of the modeling device 1B.

Referring to FIG. 7, the cameras CMa and CMb capture stereo images (#11). Images having different resolutions are generated from the two-dimensional images FT thus obtained (#12).

The position of the face area is extracted from the standard input image (#13). Corresponding points are searched for using the low-resolution images FL of this face area (#14), and three-dimensional reconstruction is performed using the low-resolution, low-precision corresponding points obtained (#15).

The standard model DS is fit to the resulting low-resolution, low-precision three-dimensional position data FDL.

First, initial fitting of the standard model DS is performed with regard to the three-dimensional position data FDL (#16). In the initial fitting, the position, posture and size of the standard model DS is changed as a whole so that it matches the three-dimensional position data FDL to the extent possible, and the standard model DS is fit to the three-dimensional position data FDL. The standard model DS is then transformed such that it matches each part of the three-dimensional position data FDL, and is further fit to the three-dimensional position data FD (#17).

As a result of the fitting in steps #16 and #17, the standard model DS is transformed into and fit to the low-precision three-dimensional position data FDL. Consequently, the image coordinates when each point of the standard model DS is projected onto a two-dimensional image are sought.

The positions of the facial components that require high-precision, such as the eyes, mouth and nose, are designated in the standard model DS in advance. The high-precision areas of the standard model DS are projected onto the standard input image, and the projected areas are extracted as high-precision areas (#18).

Corresponding point searching is performed with regard to the high-precision areas using the high-resolution images FH (#19). Using the high-resolution, high-precision corresponding points obtained, high-resolution, high-precision three-dimensional reconstruction is performed as to appropriate areas (#20).

Appropriate areas of the three-dimensional position data FDL obtained in step #15 are replaced with the high-precision three-dimensional position data FDH obtained via the three-dimensional reconstruction (#21).

Consequently, three-dimensional position data FDM, which comprises high-resolution, high-precision data for the high-precision areas, and low-resolution, low-precision data for the other areas (low-precision areas), is obtained. The standard model DS is again fit to the three-dimensional position data FDM (#22), and is then transformed (#23).

When this is done, because the results of the initial fitting and transformation carried out in steps #16 and #17 are used as the default value for the transformation in step #23, duplication of transformation processing may be prevented.

As described above, high-precision areas are extracted, and high-resolution correspondence is sought and three-dimensional reconstruction is performed with regard to high-precision areas only. Therefore, the processing speed may be increased. In addition, because during fitting, transformation processing is performed with regard to the three-dimensional position data FD, which has the optimal resolution for each area, the processing speed may be increased.

In the above embodiments, the construction of the modeling device 1 or 1B, the circuits, the number of components, the details of processing, the process sequences, and the timing at each process takes place may be varied within the scope of the present invention.

Using the present invention, the precision of areas having complex shape characteristics may be maintained at a high level while the processing time is reduced.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. An apparatus for generating a three-dimensional data set, comprising:
    an acquiring portion for acquiring a first original data set and a second original data set, the first original data set and the second original data set respectively representing first and second original images, each of the first and second original images being obtained by imaging a same object from differing observation points;
    a resolution multiplication unit for converting the first original data set and the second original data set to a first low resolution data set and a second low resolution data set, respectively;
    an extracting portion for separating high precision areas from low precision areas in the first original data set;
    a corresponding point searching unit for searching at least one set of corresponding points in the low precision areas and for searching at least one set of corresponding points in the high precision areas, the corresponding point searching unit uses results of the search of corresponding points in the low precision areas as a default for beginning the search of corresponding points in the high precision areas; and
    a three-dimensional generating portion for generating a three-dimensional data set of the object using the corresponding points found by the corresponding point searching unit and the first original data set and the second original data set and the first low resolution data set and the second low resolution data set;
    wherein the three-dimensional data set comprises a first part and a second part, the first part is generated using the first original data set and the second original data set, and the second part is generated using the first low resolution data set and the second low resolution data set; and
    the first part of the three-dimensional data set comprises the extracted high precision areas.

2. The apparatus of claim 1, wherein the three-dimensional generating portion includes:
    a three-dimensional reconstruction portion for producing three-dimensional position data using the first low resolution data set and the second low resolution data set; and
    a standard model fitting portion for fitting a standard model to the produced three-dimensional position data to generate the three-dimensional data set.

3. The apparatus of claim 2, further comprising:
    an extracting portion for projecting high-precision areas of the standard model onto the first original image and extracting the projected areas as a first partial image; and
    a seeking portion for seeking points corresponding to points in the first partial image within the second original image;
    wherein the first part of the three-dimensional data set is generated by the sought corresponding points.

4. A three-dimensional data generating device, comprising:
    a device for inputting multiple images having a first resolution from different viewpoints of an object;
    a converter for performing a resolution conversion of each of the input multiple images to generate converted images having a second resolution that is different than the first resolution;
    a characteristic area extraction unit for detecting characteristic areas of the object from at least one of the input multiple images;
    a corresponding point searching unit for searching at least one set of corresponding points in the second resolution images and for searching at least one set of corresponding points in the characteristic areas, the corresponding point searching unit uses results of the search of corresponding points in the second resolution images as a default for beginning the search of corresponding points in the characteristic areas; and
    a three-dimensional construction unit for constructing three-dimensional data of the object by using the corresponding points found by the corresponding point searching unit and data from the input images for the characteristic areas of the object and by using data from the converted images for remaining areas of the object;
    wherein the first resolution is higher than the second resolution.

5. The three-dimensional data generating device of claim 4, further comprising:

a first memory for storing the input multiple images; and a second memory for storing the converted images.

6. The three-dimensional data generating device of claim 4, wherein the data used by the construction unit is combined and stored.

7. The three-dimensional data generating device of claims 4, wherein the data used by the constructing unit is stored separately.

8. A three-dimensional data generating device, comprising:

a device for inputting multiple images that include multiple images obtained from different viewpoints of an object and having different resolutions;

a characteristic area extraction unit for selecting specific areas from at least one image;

a corresponding point searching unit for searching at least one set of corresponding points in the second resolution images and for searching at least one set of corresponding points in the characteristic areas, the corresponding point searching unit uses results of the search of corresponding points in the second resolution images as a default for beginning the search of corresponding points in the characteristic areas; and a three-dimensional construction unit for reconstructing three-dimensional data of the object by using, from among said multiple images having different resolutions, high-resolution images for the selected areas, and low-resolution images for the non-selected areas, and by seeking correspondence between the images obtained from different viewpoints.

9. A three-dimensional data generating device, comprising:

a device for inputting multiple images of an object obtained from different viewpoints;

a converter for performing resolution conversion regarding each of the input multiple images and generating multiple images having different resolutions;

a searching unit for seeking correspondence between the images obtained from different viewpoints using low-resolution images and reconstructing low-resolution three-dimensional data of the object;

a fitting unit for fitting a standard model to the reconstructed low-resolution three-dimensional data;

a unit for projecting the specific areas specified in said standard model to an image having a higher resolution than said image based on the result of the fitting;

a correspondence seeking unit for seeking correspondence between the images obtained from different viewpoints using the high-resolution image regarding the areas projected on the higher-resolution image and reconstructing high-resolution three-dimensional data of the object; and a replacing device for replacing the low-resolution three-dimensional data regarding said specific areas with high-resolution three-dimensional data;

wherein the specific areas are designated in the standard model in advance.

10. A method for generating a three-dimensional data set, the method comprising:

acquiring a first original data set and a second original data set, the first original data set and the second original data set respectively representing first and second original images, each of the first and second original images being obtained by imaging a same object from differing observation points;

converting the first original data set and the second original data set to a first low resolution data set and a second low resolution data set, respectively;

separating high precision areas from low precision areas in the first original data set;

searching at least one set of corresponding points in the low precision areas and for searching at least one set of corresponding points in the high precision areas, using results of the search of corresponding points in the low precision areas as a default for beginning the search of corresponding points in the high precision areas; and generating a three-dimensional data set of the object using the corresponding points found by the searches and the first original data set and the second original data set and the first low resolution data set and the second low resolution data set;

wherein the three-dimensional data set comprises a first part and a second part, the first part is generated using the first original data set and the second original data set, and the second part is generated using the first low resolution data set and the second low resolution data set; and the first part of the three-dimensional data set comprises the extracted high precision areas.

11. The method of claim 10, wherein the generating step includes:

producing three-dimensional position data using the first low resolution data set and the second low resolution data set; and fitting a standard model to the produced three-dimensional position data to generate the three-dimensional data set.

12. The method of claim 11, further comprising:

projecting high-precision areas of the standard model onto the first original image and extracting the projected areas as a first partial image; and seeking points corresponding to points in the first partial image within the second original image;

wherein the first part of the three-dimensional data set is generated by the sought corresponding points.

13. A recording medium for recording a program for generating three-dimensional data according to the method of claim 10.

14. A method of generating three-dimensional data, comprising the steps of:

inputting multiple images having a first resolution from different viewpoints of an object;

performing a resolution conversion of each of the input multiple images to generate converted images having a second resolution that is different than the first resolution;

detecting characteristic areas of the object from at least one of the input multiple images;

searching at least one set of corresponding points in the second resolution images and for searching at least one set of corresponding points in the characteristic areas, using results of the search of corresponding points in the second resolution images as a default for beginning the search of corresponding points in the characteristic areas; and constructing three-dimensional data of the object by using the corresponding points found by the searches and data from the input images for the characteristic areas of the object and by using data from the converted images for remaining areas of the object;

wherein the first resolution is higher than the second resolution.

15. The method of claim 14, further comprising the steps of combining and storing the three-dimensional data.

16. The method of claim 14, wherein the three-dimensional data is stored separately.

* * * * *